Patented July 10, 1934

1,966,376

UNITED STATES PATENT OFFICE 1,966,376

CONVERTING COPPER MATTE

Thomas Willard Cavers and George McCrory Lee, Anyox, British Columbia, Canada

No Drawing. Application September 6, 1933, Serial No. 688,392

12 Claims. (Cl. 75—62)

The present invention is based upon the discovery made by us that, in the production of metallic copper from matte by the Bessemerizing process, after the formation of white metal, the first portion of the blister copper produced carries down with it the major part of the precious metals (gold, platinum and the like) and the impurities (arsenic, antimony and like metals) present in the original matte and the fluxes and, that when the white metal has been separated from the first blister by skimming and removed to another convertor, blown to metallic copper and the blowing continued until most or a large proportion of the copper has been oxidized, the copper remaining unoxidized contains practically all of the precious metals that were left in the white metal of the first operation and, that the oxidized copper, copper oxide, may be skimmed from the metallic copper and reduced in another vessel by carbon or some other reducing agent, thus producing refined copper, that is, copper free from precious metals and impurities such as arsenic, antimony and the like.

In accordance with the present invention, we start with matte and first form the white metal and slag by blowing the matte in the presence of a flux with air in a Bessemer convertor, and then separate the slag from the white metal, as in the approved prior practice. Then we blow the white metal in the convertor with air until some copper (preferably a small proportion of the copper) has been thrown down from the white metal; then we separate the white metal (or most of it) from the copper, and continue the blowing of the separated white metal with air in another convertor up to and beyond the blister copper stage and until most of the copper has been oxidized. The copper oxide is liquid at the temperature obtaining in the convertor and floats on the metal bath in the convertor. Then the copper oxide is separated from the metallic copper and removed to another vessel or apparatus where it is reduced to refined copper by wood, coke, charcoal or some other suitable reducing agent. The copper remaining in the convertor after the copper oxide has been removed, contains precious metals. It may be finished as it is and treated electrolytically for the recovery of the gold, silver and like metals; or it may form the basis of a new charge by the addition of matte, thus starting the cycle anew; or it may be combined with the copper left after the white metal of the first blowing of white metal has been removed and the process begun all over again by the addition of matte to the convertor containing them, all being blown to white metal as before.

While the prior practice has been to oxidize a small percentage of the copper of a "batch" in a reverberatory furnace for the refining of copper in which practice the copper oxide performed the office of carrying oxygen to the arsenic, antimony, bismuth and like metals alloyed with the copper, to force them to pass off as slag or gas, that process could not be employed for the recovery of precious metals.

In the present invention, all of the copper that is refined (except the portions which may have been electrolytically refined as herein described), has first been in the form of copper oxide; the operation from matte to finished product is continuous, since the materials are never allowed to cool until the copper is finally poured into molds; and the whole operation may be conducted in convertors, although the reduction of the copper oxide may be made in a small reverberatory furnace.

The advantage of treating matte by bringing it up to white metal and blowing to throw down part of the copper contained in the white metal, as an integral part of the process, resides in the fact that most or practically all of the arsenic, antimony and like metals present, which, in the copper industry are considered as impurities, migrate from the sulphide (white metal) to the metallic copper and remain in the convertor when the white metal is skimmed off, thus rendering the copper produced from the copper oxide of the subsequent operation purer than it otherwise would be.

The copper blister, which is enriched with precious metals, may be as low as one-quarter of one per cent of the total copper produced, and may be refined electrolytically for the recovery of the precious metals it contains.

The refined copper produced from the oxide in the manner above indicated has been found to contain 0.015 ounces gold, 8.9 ounces silver per ton of copper.

The copper oxide is reduced preferably in a hot vessel or chamber lined with magnesite or other refractory material, and the coke or charcoal used for reduction of the oxide may be previously heated to redness before it is contacted with the copper oxide, thereby shortening the time of reduction and producing, by the rapidity of the reaction between the copper oxide and the hot carbon sufficient heat to keep the copper in a molten state until cast. For example, the liquid copper oxide may be poured or allowed to descend (preferably slowly) through a column of red hot coke or carbon, and the copper as metallic copper collected at or near the base of the column.

We claim:

1. In the art of producing copper from matte, a method of producing copper of different grades, one grade containing practically all of the precious metals originally contained in the matte and flux and another being practically free from the precious metals and such impurities as arsenic, antimony, bismuth and like metals, in a continuous process from matte to the said end products, by blowing the matte to metallic copper and copper oxide, separating copper oxide and reducing it to metallic copper.

2. In the converting of copper, a method of producing copper containing practically all of the precious metals and the impurities contained in the matte and flux, which comprises blowing matte in a convertor until white metal is produced, continuing the blowing after removing the slag, until some metallic copper has been thrown down, separating the remaining white metal from the copper, which copper contains practically all the impurities and a large part of the precious metals, blowing the white metal in another convertor until the charge is finished, continuing the blowing until most of the copper has been oxidized leaving a small portion of metallic copper, and removing the copper oxide from the metallic copper that contains practically all of the precious metals carried over with the white metal from the first operation.

3. In the converting of copper, a method of producing copper practically free from the precious metals and impurities such as arsenic, antimony and the like, originally contained in the matte and flux, which comprises blowing matte in a convertor until white metal has been produced and the slag removed by skimming, continuing the blowing until some metallic copper has been thrown down, skimming off most of the white metal remaining, transferring it to another vessel, blowing the white metal until the charge is finished, that is, until substantially all the copper is in the metallic state, continuing the blowing until a large percentage of the copper has been oxidized, skimming off the copper oxide and transferring it to another vessel, there reducing the oxide to metallic copper by a reducing agent, thus producing refined copper.

4. In the converting of copper, a method of producing copper practically free from the precious metals and impurities such as arsenic, antimony and the like, originally contained in the matte and flux, which comprises blowing matte in a convertor until white metal has been produced and the slag removed by skimming, continuing the blowing until some metallic copper has been thrown down, skimming off most of the white metal remaining, transferring it to another vessel, blowing the white metal until the charge is finished, that is until substantially all the copper is in the metallic state, continuing the blowing until a large percentage of the copper has been oxidized, skimming off the copper oxide and transferring it to another vessel containing a heated reducing agent, thereby reducing the oxide and producing refined copper.

5. In the converting of copper, a method of producing copper practically free from the precious metals and impurities such as arsenic, antimony and the like, originally contained in the matte and flux, which comprises blowing matte in a convertor until white metal has been produced and the slag removed by skimming, continuing the blowing until some metallic copper has been thrown down, skimming off most of the white metal remaining, transferring it to another vessel, blowing the white metal until the charge is finished, that is, until substantially all the copper is in the metallic state, continuing the blowing until a large percentage of the copper has been oxidized, skimming off the copper oxide and pouring it slowly through a column of red hot carbonaceous material and receiving the reduced metal in a suitable vessel.

6. In the converting of copper, a method of producing a fraction of the total production as copper containing practically all of the precious metals originally contained in the matte and flux, which comprises blowing matte in a convertor until white metal has been produced and the slag removed by skimming, continuing the blowing until some metallic copper has been thrown down, skimming off most of the white metal remaining, transferring the white metal to another convertor, blowing until the charge is finished, continuing the blowing until a larger percentage of the copper has been oxidized, skimming off the copper oxide, adding new matte to the copper remaining and following the same process as if it were all new matte, to build up a new charge for the production of both refined copper and precious-metal-bearing copper.

7. In the converting of copper, a method of producing a fraction of the total production as copper containing practically all of the precious metals originally contained in the matte and flux, which comprises blowing matte in a convertor until white metal has been produced and the slag removed by skimming, continuing the blowing until some metallic copper has been thrown down, skimming off most of the white metal remaining, transferring the white metal to another convertor, blowing until the charge is finished, continuing the blowing until a large percentage of the copper has been oxidized, skimming off the copper oxide, combining the remaining copper with the copper left in the convertor after the white metal has been skimmed off in the first operation, adding matte to the combined portions of copper and proceeding as if it were an entirely new charge of matte, continuing the cycle of operations until the copper remaining after white metal and copper oxide have been skimmed off has reached the desired degree of concentration of the precious metals.

8. The process of producing copper from matte which comprises blowing matte to white metal, blowing white metal so produced until a small part is transformed into metallic copper, separating white metal from the mass resulting from the preceding step and thereafter blowing the white metal so separated until it is largely converted into copper oxide.

9. The process of producing copper from matte which comprises blowing matte to white metal, blowing white metal so produced until a small part is transformed into metallic copper, separating white metal from the mass resulting from the preceding step and thereafter blowing the white metal so separated until it is converted into metallic copper and a larger amount of copper oxide.

10. The process of treating white metal, resulting from the blowing of copper matte, which comprises blowing the white metal until the charge is finished, that is, until substantially all the copper is in the metallic state, continuing the blowing until a large percentage, but not all, of the copper has been oxidized, separating copper oxide formed from remaining metallic copper, and reducing the copper oxide to produce refined copper.

11. The process of treating white metal which comprises blowing white metal until it is converted into copper, blowing said copper until it is only partially converted into copper oxide, the metallic copper remaining becoming enriched with other metals.

12. In the art of treating white metal to separate impurities therefrom, the step of blowing white metal until it is converted largely into copper oxide with a residue of metallic copper.

GEORGE M. LEE.
THOMAS W. CAVERS.